Figure 1:
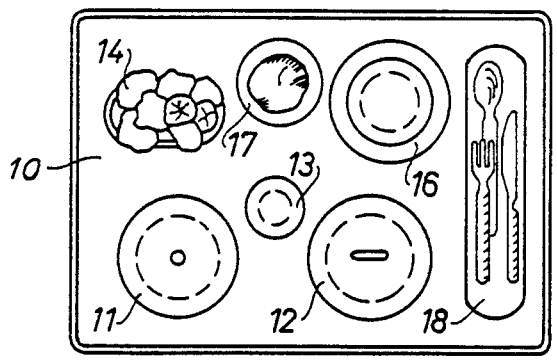

United States Patent [19]

Meier

[11] Patent Number: 4,776,386
[45] Date of Patent: Oct. 11, 1988

[54] APPARATUS FOR COOLING, STORING AND REHEATING FOOD USING INDUCTION HEATING

[76] Inventor: Hermann Meier, Sonnsyterain 23, CH-6048 Horw, Switzerland

[21] Appl. No.: 856,332

[22] Filed: Apr. 28, 1986

[30] Foreign Application Priority Data

Apr. 29, 1985 [CH] Switzerland .................. 1819/85

[51] Int. Cl.$^4$ ........................................... F25B 29/00
[52] U.S. Cl. ..................... 165/48.1; 165/61; 165/64; 165/918; 219/10.491; 219/10.75; 126/390; 312/236
[58] Field of Search .............. 165/48.1, 61, 63, 64, 165/918, 919; 219/10.49, 10.75; 126/390; 312/236

[56] References Cited

U.S. PATENT DOCUMENTS

| | | | |
|---|---|---|---|
| 3,830,148 | 8/1974 | Shevlin | 165/918 |
| 3,886,346 | 5/1975 | Meyers | 165/48.1 |
| 3,897,989 | 8/1975 | Grandi | 165/918 |
| 3,966,426 | 6/1976 | McCoy et al. | 219/10.49 |
| 4,019,022 | 4/1977 | Seider et al. | 165/48.1 |
| 4,020,310 | 4/1977 | Souder, Jr. et al. | 165/919 |
| 4,103,736 | 8/1978 | Colato et al. | 165/48.1 |
| 4,182,405 | 1/1980 | Hysen et al. | 165/918 |
| 4,285,391 | 8/1981 | Bourner | 165/919 |
| 4,533,807 | 8/1985 | Minamida | 219/10.49 R |
| 4,596,236 | 6/1986 | Eide | 126/390 |

FOREIGN PATENT DOCUMENTS 2209285 6/1974 France .
2711088 9/1978 Fed. Rep. of Germany .
586538 4/1977 Switzerland .

Primary Examiner—Albert W. Davis, Jr.
Assistant Examiner—John K. Ford
Attorney, Agent, or Firm—Morris Fidelman; Franklin D. Wolffe

[57] ABSTRACT

In this process, the prepared food, in portions and together with the cutlery, is arranged on a tray and placed in a refrigerator. Those parts of each portion which are to be heated before serving are introduced into containers which can be inductively heated, and each shelf, in the refrigerator, on which the tray is to be placed contains means for inductively heating these containers. To avoid the situation in which, during serving, some parts of the portion are hot and the others are still at refrigeration temperature, the inductively heatable containers are covered with a lid, the outside of which is also inductively heatable, and/or possess an outer surface, at least part of which can be inductively heated. Consequently, during inductive heating of the interior of the container and the food present therein, the external environment of the container and the food present there, as well as the cutlery, are brought to ambient temperature.

8 Claims, 1 Drawing Sheet

APPARATUS FOR COOLING, STORING AND REHEATING FOOD USING INDUCTION HEATING

The present invention relates to a process for cooling, storing and reheating food, in which the food, prepared so that it is ready to eat, is arranged in the form of multi-part meals and the parts of each meal, with or in the associated tableware for eating and/or drinking, are arranged on a tray and introduced into a refrigerator for the purposes of cooling and storing, and, before the tray is handled for serving, those parts of the metal intended to be eaten hot are selectively heated in the refrigerator, and an apparatus for carrying out this process.

Modern teaching on physiologically correct nutrition recommends a varied diet for both working and sick people, and the preparation of this diet is often not very compatible with the requirement in respect of a rational procedure for preparing the food. Particularly in factory canteens and hospital kitchens, it is therefore usual for the meals not to be prepared at mealtimes but to be prepared in advance, arranged on a tray, cooled together with the tray and reheated only shortly before being served. This makes it possible to employ a relatively small staff to prepare a large number of multi-part meals, which can then be served simultaneously.

A typical multi-part meal consists of, for example, a soup, meat with an accompaniment and vegetable, salad or fruit, a dessert and a beverage. In this meal, only the soup, the meat, the accompaniment and the vegetable have to be reheated before being served, whereas the salad and the fruit would become inedible on heating; hence, French Patent No. 2,209,285 (72.44646) describes a storage cabinet which possesses two sections which can be insulated thermally from one another, both of the said sections being capable of being cooled and one of them being capable of being heated by means of suitably arranged electrial heating resistances. When the parts of a meal are arranged on a tray in a suitable manner, this refrigerator can be used first to cool the entire meal and then to reheat part of the meal prior to serving, while cooling of the other part is continued. Swiss Patent No. 586,538 describes a refrigerator in which trays are placed, each of the said trays having at least one heatable depression into which a container for a part of a meal to be heated up can be placed. This Patent also describes heat-insulating covers for the containers to be heated, the said covers being intended to prevent the conduction of heat into the region surrounding the container. Finally, German Offenlegungschrift No. 2,711,088 describes an apparatus which can be used for inductively heating food containers which are suitably metallized. For this purpose, metal layers are arranged inside the partially hollow container wall or on the inner surface of the container in such a way that the heat is conducted into the interior of the container, and heat loss to the outside is very effectively prevented.

However, as found when the apparatus described is used in practice, serving a complete meal which comprises parts which have been heated to eating temperature and other parts which have continued to be cooled does not conform to the requirements or eating patterns of the consumers, who generally decline a salad or fruit or tableware and cutlery at refrigerator temperature.

It is therefore the object of the present invention to overcome the disadvantage described and to provide a process in which each of the parts of a meal which are arranged on a tray, and the tableware and cutlery, are at the temperature expected by the consumer during serving.

This object is achieved, according to the invention, by a process of the type stated at the outset, wherein reheating of the parts of the meal which are intended to be consumed hot is carried out at the same time as the other parts of the said meal, the tableware and the cutlery are brought to ambient temperature.

The process according to the invention permits the parts to be reheated of a meal arranged on a tray and stored in a refrigerator to be selectively heated to eating temperature, and the other parts to be warmed only to such an extent that they can be consumed with good appetite or are pleasant to use. The process is particularly suitable for the labor-saving "tray distribution system", in which trays with preprepared complete meals, the necessary tableware and the cutlery are placed in refrigerators and then served simultaneously to a large number of people.

A preferred apparatus for carrying out the process according to the invention comprises a cabinet which is provided for the insertion of trays standing one on top of the other and containing the meals and which has a cooling unit and at least one generator for inductively transmittable electrical energy, and tableware for eating and/or drinking, which is provided, for the selectively reheatable parts of the meal, with at least one electrically conducting layer suitable for inductively heating the interior of the container. In this apparatus, the inductively heatable tableware is capable of conducting heat to the external environment of the tableware.

In a first, particularly preferred apparatus for carrying out this process, the inductively heatable tableware intended to conduct heat to the external environment contains at least one belt-shaped, electrically conducting layer arranged on the outer wall. In another preferred embodiment, the tableware possesses a lid on whose outer surface an electrically conducting layer is arranged, or which consists entirely of electrically conducting material.

An example of the apparatus suitable for carrying out the process according to the invention is described below with the aid of the figures.

Figure 2:
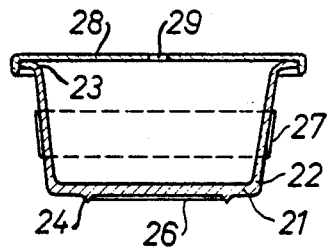
Figure 3:
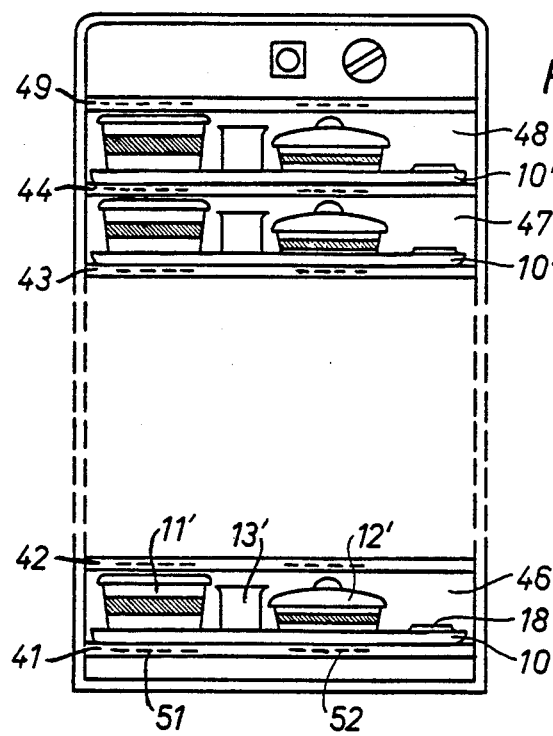

FIG. 1 shows a plan view of a tray holding a multipart meal and associated cutlery, FIG. 2 shows a section through a food container which possesses a lid and which is suitable for inductively heating the interior of the container and for conducting heat to its external environment, and FIG. 3 shows the front view of a cabinet for cooling, storing and reheating prepared meals.

FIG. 1 shows a plan view of a tray 10 which is set up for service according to the "tray distribution system". On one longitudinal half of the tray (in the lower part of the figure), a soup tureen 11 and a dish 12 for meat and accompaniments are arranged side by side. The tureen and the dish are intended to be heated and are covered with a lid or a bell-shaped cover. A cup 13 for coffee, tea or milk is positioned roughly in the middle of the tray, and on the other longitudinal half of the tray (in the upper part of the figure) stand a plate 14 containing salad, a plate 16 into which soup may be ladled or onto which meat and accompaniment may be transferred, and, between these, a dish 17 containing fruit. A trough 18 which contains a complete set of cutlery is molded along one narrow side of the tray (on the right-hand side of the figure). These last-mentioned containers and their contents, and the cutlery, are not intended to be heated prior to serving, but are to be kept at ambient temperature. Under each of the containers described, the tray preferably has an annular depression which is indicated by a broken line in the figure and in which the bead of the positioned containers which projects downward and is likewise annular can be inserted in order to prevent the containers from being displaced from the intended position. This is particularly important for the tureen and the dish whose contents are to be heated.

FIG. 2 shows a section through a soup tureen which is suitable for inductively heating the interior and keeping the environment at a suitable temperature. The tureen has a flat bottom 21 and a steep side wall 22, which ends at the top in an edge 23 which is bent outward. The outer surface of the bottom possesses the stated molded annular bead 24 which projects downward and is intended for insertion into the annular depression in the tray, which depression is described above. On the base area enclosed by the bead, and on the outer surface of the side wall, a thin circular or annular metal layer 26 and 27, respectively, is applied. The relatively high tureen is covered with a flat metal lid 28. The lid possesses, in the center, a small opening 29 which serves as a steam outlet and may also be used for lifting the lid.

FIG. 3 shows a front view of a refrigerator suitable for carrying out the process according to the invention. The refrigerator contains ten shelves which are arranged one on top of the other (for the sake of clarity only shelves 41, 42, 43 and 44 are shown) and which divide the inside of the refrigerator into ten compartments (of which only compartments 46, 47 and 48 are shown). A further shelf 49 is arranged above the uppermost compartment 48. Each shelf contains two induction coils which are in the form of spiral electrical conductors, for the sake of greater clarity only the coils 51 and 52 in the lowest shelf 41 being identified. The induction coils are connected to the output of an audiofrequency generator which is not shown. Each refrigerator compartment is intended to hold a tray 10′, 10″, 10‴, etc., on which the tableware required for a meal is placed. In the side view shown, for the sake of simplicity, once again only the soup tureen 11′, the dish 12′ for meat and the accompaniment, the cup 13′ and the trough 18′ for the cutlery on or in the tray 10′ are provided with reference symbols.

The refrigerator is preferably closed at the front by a glass door, which permits observation of the contents, and of course contains a cooling unit and the audiofrequency generator already mentioned. Cooling units and audiofrequency generators are sufficiently well known to any skilled worker, and a detailed description of these is therefore intentionally omitted here.

It is evident from the above that the annular depressions in the trays are arranged so that they are located as exactly as possible above the induction coils in the shelf after a tray has been inserted into a refrigerator compartment, so that optimum transfer of the electrical energy from the induction coils to the metal layers of the containers standing in the depressions is achieved. As will also be recognised immediately by any skilled worker, the shelf 49 above the uppermost compartment 48 is necessary in order that the lid and the bell-shaped cover on the tureen or on the dish on the inserted tray 10‴ are also heated by the induction coils in this shelf.

In carrying out the process according to the invention using the apparatus described, the individual parts of a meal are prepared in the kitchen and placed in the appropriate containers, and the containers are placed on the tray and inserted into the refrigerator together with the tray. The refrigerator is preferably precooled before the tray is inserted, since the most recent discoveries in the field of nutrition show that rapid cooling of the food prolongs its shelf life and helps to retain its aroma.

Before the meals are served, the cooling unit of the refrigerator is switched off and the audiofrequency generator is switched on. The audiofrequency current then generates an alternating electromagnetic field in the induction coils in the shelves, the said field predominantly radiating transversely with respect to the surface of the coils, i.e. upward and downward. The alternating field induces currents in the metal layers on the outer surface of the bases and the side walls of the containers placed above the coil, as well as in the metal lid of the containers placed below the coil, the said currents heating the metal layers and the lid, respectively. The heat is conducted through the container walls and the lid into the interior of the container in order to heat the contents of the container, but is also released into the environment of the container. Consequently, when the tray containing the heated food is removed from the refrigerator, the food which is not to be heated, and in particular the tableware and cutlery, are found to be warmed to room temperature.

In a tested embodiment of the apparatus, a cooling unit conventionally employed for refrigerators was used in the refrigerator. The useful volume of the refrigerator was divided into twelve compartments, and in each compartment it was possible to place one tray having dimensions conforming to the European standard (36×53 cm). The internal height of each compartment was 9 cm, which permits the use of a soup pot having a capacity of 250 cm$^3$. All containers were made of hotel china, and the metal layers and the fully metal lid were made of a ferromagnetic material. The audiofrequency generator operated at a frequency of 25 kHz, and the induction coils in the trays each had an inductance of 350 $\mu$ Hy. Although the transmitted energy which can be used for heating the food or keeping the environment of the containers at a suitable temperature depends on the current through the induction coils, on the distance between the coils and the metal layers of the containers or the metal lids, on the area and the thickness and on the magnetic permeability of the metal layers or of the metal, it was possible, in the course of less than 30 minutes, using a generator which produced an output power of 3 kW, to heat one soup tureen and one meat container together with the contents on eleven trays from 4° C. to above 65° C. and to keep the tableware, the cutlery and all accompaniments at room temperature.

It is of course clear that the process according to the invention and the apparatus proposed for carrying it out can be adapted to specific operating conditions. For example, the annular metal layers provided for inductively heating the outer surface of the side walls of the containers can be dispensed with if the thermal conductivity of the container wall is sufficient to conduct heat from the interior to the exterior. Furthermore, the flat lid shown in FIG. 2 may be replaced with a high lid (bell-shaped cover) possessing a handle. A handle of this type may be advantageous when it is intended to avoid excessive heating of the lid and excessive heating of the contents of the container from above. Instead of one audiofrequency generator for all shelves of the refrigerator, as described, it is also possible to allocate a separate audiofrequency generator to each shelf. Furthermore, the fixed shelves can be dispensed with if the side walls of the refrigerator possess guide rails and support rails for the trays, the induction coils are incorporated in the tray and each tray possesses means which permit the transfer of the electrical energy from the audiofrequency generator to the induction coil or coils. Finally, a plurality of refrigerators of the type shown in FIG. 3 can be set up side by side, and hence the volume of the refrigerator and the number of insertable trays can be increased several times over.

Furthermore, the trays need not be provided with a trough for the cutlery. The cutlery may be placed in any position next to or between the tableware described, in the manner which is most advantageous for a selected "tray distribution system". Moreover, it is not necessary to use tureens, dishes, cups and plates whose bottom surface possesses a bead which can be used for insertion into depressions in the tray. Containers to be heated inductively and possessing a flat bottom can simply be placed in the corner regions of the tray (at the back of the refrigerator), and each compartment wall of the refrigerator can have fixed guide elements which, when a tray is inserted, push the container which comes into contact into the position provided for heating.

I claim:

1. Apparatus for cooling, storing and reheating multi-part meals arranged on a serving tray including at least one type of container for a food component to be served in heated state and at least one other type of container for a food component to be served at about ambient temperature and comprising:
    a cabinet adapted for insertion therein of multi-part meal laden trays disposed, one above the other, said cabinet having associated therewith refrigeration means adapted to cool all contents of the multi-part meal laden trays inside said cabinet to a below ambient temperature chilled state, and an induction heat generator, said cabinet having therein a multiplicity of induction coils operatively connectable to said induction heat generator with at least one induction coil being adjacent each tray positionally related thereto so that such induction coil is in close proximity to a container thereon for a food component to be served in heated state; and
    at least one means for heating the container contents of said one type of container and for warming other food components on each tray from said chilled state to about ambient temperature, said heating and warming means being electrically conductive and inductively heatable and being situated on an outer surface of each said one type of container and having at least a portion of said one type of container exposed to surrounding air;
    whereby all food components of multi-part meals on the serving trays may be cooled and stored in said cabinet in a chilled state and be selectively heated through operation of said induction heat generator.

2. An apparatus as in claim 1, and said serving tray further comprising:
    cutlery which is warmed to about ambient temperature by said heating and warming means.

3. An apparatus as in claim 1, and further comprising:
    said one type of container being hotel china.

4. An apparatus as in claim 1 wherein each said one type of container comprises an inductively heatable electrically conductive layer on the bottom thereof.

5. An apparatus as in claim 1 wherein each said one type of container comprises inductively heatable electrically conductive layer on the outer side wall thereof.

6. An apparatus as in claim 1 wherein each said one type of container comprises a lid being at least in part formed from an inductively heatable electrically conductive material.

7. An apparatus as in claim 1 wherein each said one type of container comprises an inductively heatable electrically conductive layer in the bottom thereof and on the outer side wall thereof, said cabinet further comprising a multiplicity of spaced apart shelves whereon said trays sit, at least one induction coil being located inside each shelf, said inductively heatable electrically conductive side layers serving in part to warm the interior of said cabinet.

8. An apparatus as in claim 7, and further comprising:
    a lid on each said one type of container, the lid being at least in part formed from inductively heatable electrically conductive material, said lids serving in part to warm an interior of said cabinet.

* * * * *